US006571470B1

United States Patent
Mortzheim et al.

(10) Patent No.: US 6,571,470 B1
(45) Date of Patent: Jun. 3, 2003

(54) METHOD OF RETROFITTING SEALS IN A GAS TURBINE

(75) Inventors: Jason Paul Mortzheim, Niskayuna, NY (US); Norman Arnold Turnquist, Sloansville, NY (US); Osman Saim Dinc, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,268

(22) Filed: Dec. 6, 2001

(51) Int. Cl.⁷ .................................................. B23P 15/00
(52) U.S. Cl. .................... 29/889.1; 29/401.1; 29/402.02
(58) Field of Search ........................... 29/889.1, 401.1, 29/402.02; 277/1, 355, 347; 415/170.1, 173.1, 173.3, 230, 231

(56) References Cited

U.S. PATENT DOCUMENTS

| 4,415,309 A | | 11/1983 | Atterbury | |
| 4,420,161 A | * | 12/1983 | Miller | 277/418 |
| 5,613,829 A | | 3/1997 | Wolfe et al. | |
| 5,749,584 A | * | 5/1998 | Skinner et al. | 415/173.5 |
| 6,045,134 A | * | 4/2000 | Turnquist et al. | 277/347 |
| 6,105,967 A | * | 8/2000 | Turnquist et al. | 277/355 |
| 6,131,910 A | * | 10/2000 | Bagepalli et al. | 277/355 |
| 6,131,911 A | * | 10/2000 | Cromer et al. | 277/355 |
| 6,257,586 B1 | * | 7/2001 | Skinner et al. | 277/303 |
| 6,308,958 B1 | * | 10/2001 | Turnquist et al. | 277/355 |
| 6,367,806 B1 | * | 4/2002 | Turnquist et al. | 277/355 |
| 6,390,476 B1 | * | 5/2002 | Tong et al. | 277/355 |
| 2001/0007384 A1 | * | 7/2001 | French et al. | 166/373 |

* cited by examiner

Primary Examiner—I Cuda Rosenbaum
(74) Attorney, Agent, or Firm—Patrick K. Batnode; Christian G. Cabou

(57) ABSTRACT

A method of retrofitting a gas turbine wherein the gas turbine comprises a stator and a rotor. The rotor is coaxially aligned with the stator and spaced apart from the stator so as to define a gap therebetween. The method of retrofitting comprises fixedly securing a sealing member to the stator. The sealing member is configured to restrict a flow of a fluid medium in a fluid path across the gap and generate a pressure drop generally transverse to the gap during operation of the gas turbine.

21 Claims, 4 Drawing Sheets

METHOD OF RETROFITTING SEALS IN A GAS TURBINE

BACKGROUND OF INVENTION

The present invention relates generally to rotary machines, and more particularly to retrofitting gas turbines.

Gas turbines typically comprise combustion-type gas turbines, which utilize combustion gases to turn rotors, and steam-type gas turbines, which utilize steam to turn rotors. Examples of gas turbines include, but are not limited to, gas-turbine power-generation equipment and gas turbine aircraft engines. A combustion-type gas turbine has a gas path which typically includes, in serial-flow relationship, an air intake (or inlet), a compressor, a combustor, a turbine, and a gas outlet (or exhaust nozzle). A steam-type gas turbine has a gas path which typically includes a steam inlet, a turbine, and a steam outlet.

Compressors and turbines include rotating rotors rotatably attached to surrounding non-rotating stators by suitable bearings. Gas paths between compressors and combustors and between combustors and turbines include annular transition ducts having radially inner and outer stator portions. At certain axial locations, rotors typically include radially-outwardly projecting rotor blades, and at certain axial locations, stators typically include radially-inwardly projecting stator vanes. Some gas turbines include high and low pressure compressors and high and low pressure turbines with the high pressure compressor rotor surrounding the low pressure compressor rotor and with the high pressure turbine rotor surrounding the low pressure turbine rotor. Gas leakage between certain gas-turbine components is undesirable because it wastes gas (e.g., air, combustion gas, steam, etc.) causing a loss in power and efficiency. In some designs, such loss in power and efficiency occurs due to gas leakage past a rotor/stator or rotor/rotor bearing with additional problems including overheating of the bearing causing excessive oil use.

In other applications, conventional gas-turbine power-generation equipment includes gas turbines having a honeycomb-labyrinth seal fixedly secured to the stator and labyrinth hard teeth attached to the rotor. It is known that the labyrinth hard teeth will abrade away a portion of the honeycomb segment due to differential thermal movement during startup or shutdown. While honeycomb-labyrinth seals have proved reliable, their performance degrades over time as a result of transient events in which the stationary and rotating components interfere, rubbing the labyrinth teeth in a "mushroom profile" or cutting grooves into the honeycomb material. Either event results in increasing the radial clearance between the stationary and rotating components thereby resulting in increased gas leakage. As a result, replacement of the labyrinth teeth and the honeycomb portion with conventional brush seals is desirable in some designs. However, removal of these components results in an undesirable off-nominal radial clearance between the stationary and rotating components thereby limiting the use of conventional brush seals to replace such honeycomb-labyrinth seals.

Accordingly, there is a need in the art for a method of retrofitting a gas turbine having improved leakage control between stationary and rotating components.

SUMMARY OF INVENTION

One embodiment of the present invention comprises a method of retrofitting a gas turbine wherein the gas turbine comprises a stator and a rotor. The rotor is coaxially aligned with the stator and spaced apart from the stator so as to define a gap therebetween. The method of retrofitting comprises fixedly securing a sealing member to the stator. The sealing member is configured to restrict a flow of a fluid medium in a fluid path across the gap and generate a pressure drop generally transverse to the gap during operation of the gas turbine.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
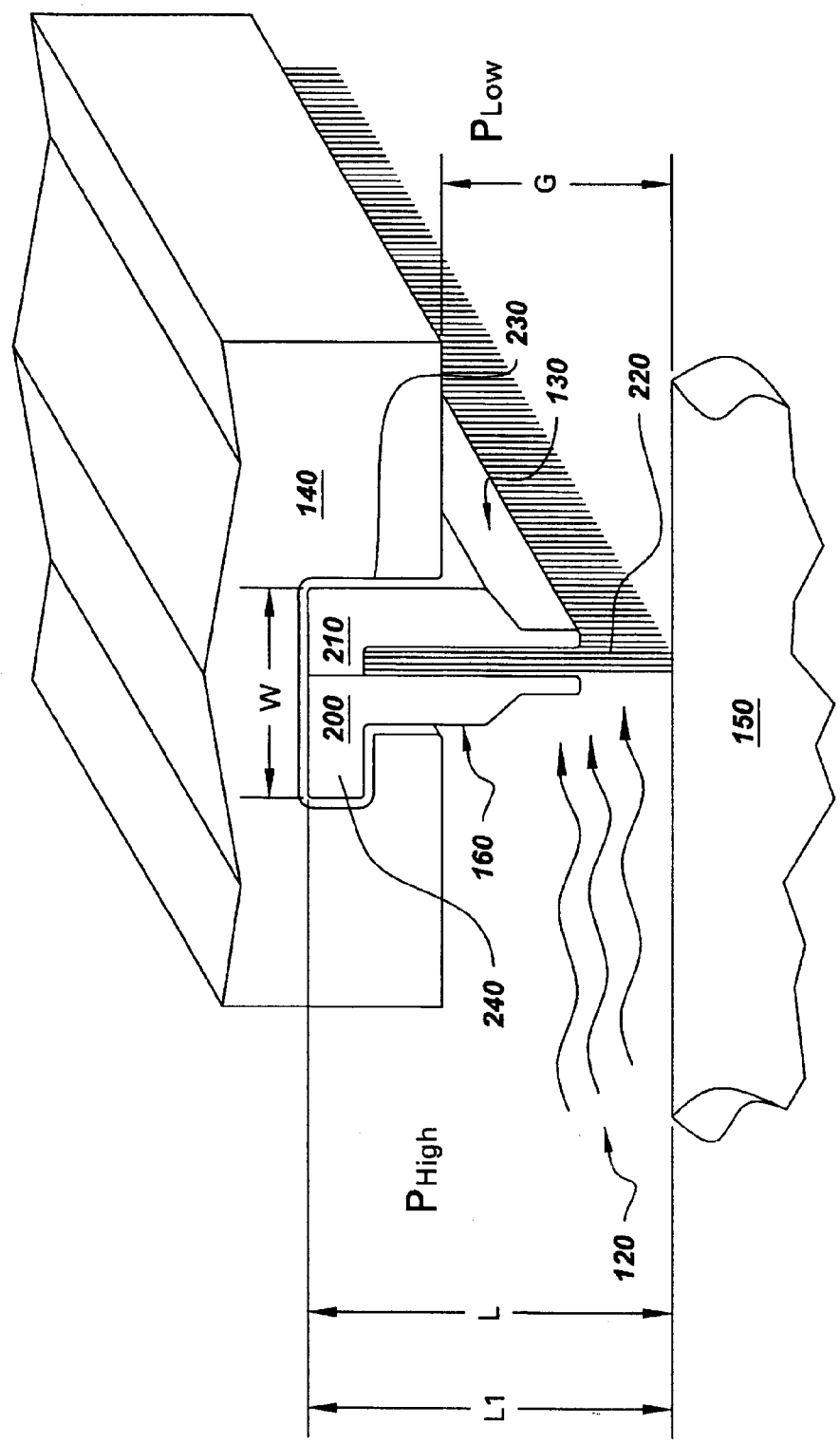
FIG. 1 is a schematic, cross sectional view of an extended brush seal in accordance with one embodiment of the present invention.

As shown in FIG. 1, one embodiment for a method for retrofitting a gas turbine comprises providing a stator 140 and a rotor 150, wherein the rotor 150 is coaxially aligned with the stator 140. Stator 140 typically has at least one channel 230 disposed therein. It will be appreciated that in some embodiments, channel 230 is a pre-existing channel disposed within stator 140. In other embodiments, channel 230 is a new channel formed into the stator 140. The rotor 150 is spaced apart from the stator 140 so that a gap, having a radial clearance designated "G", is defined between the stator 140 and rotor 150. Furthermore, the embodiment comprises providing a sealing member 130 configured for being fixedly secured to the stator 140, wherein the sealing member 130 acts to restrict a flow of a fluid medium 120 in a fluid path across the gap and generate a pressure drop generally transverse to the gap during operation of the gas turbine. "Fixedly secured", as used herein, refers to the placement of the sealing member 130 in the stator 140 such that the sealing member 130 is radially immovable and definitely located when disposed in the stator 140. For illustrative purposes, it will be appreciated, however, that fluid medium 120 in the fluid path flows from the high pressure side, designated "Phi", towards the low pressure side, designated "Plow", i.e., from the left to right of drawing FIG. 1.

Figure 2:
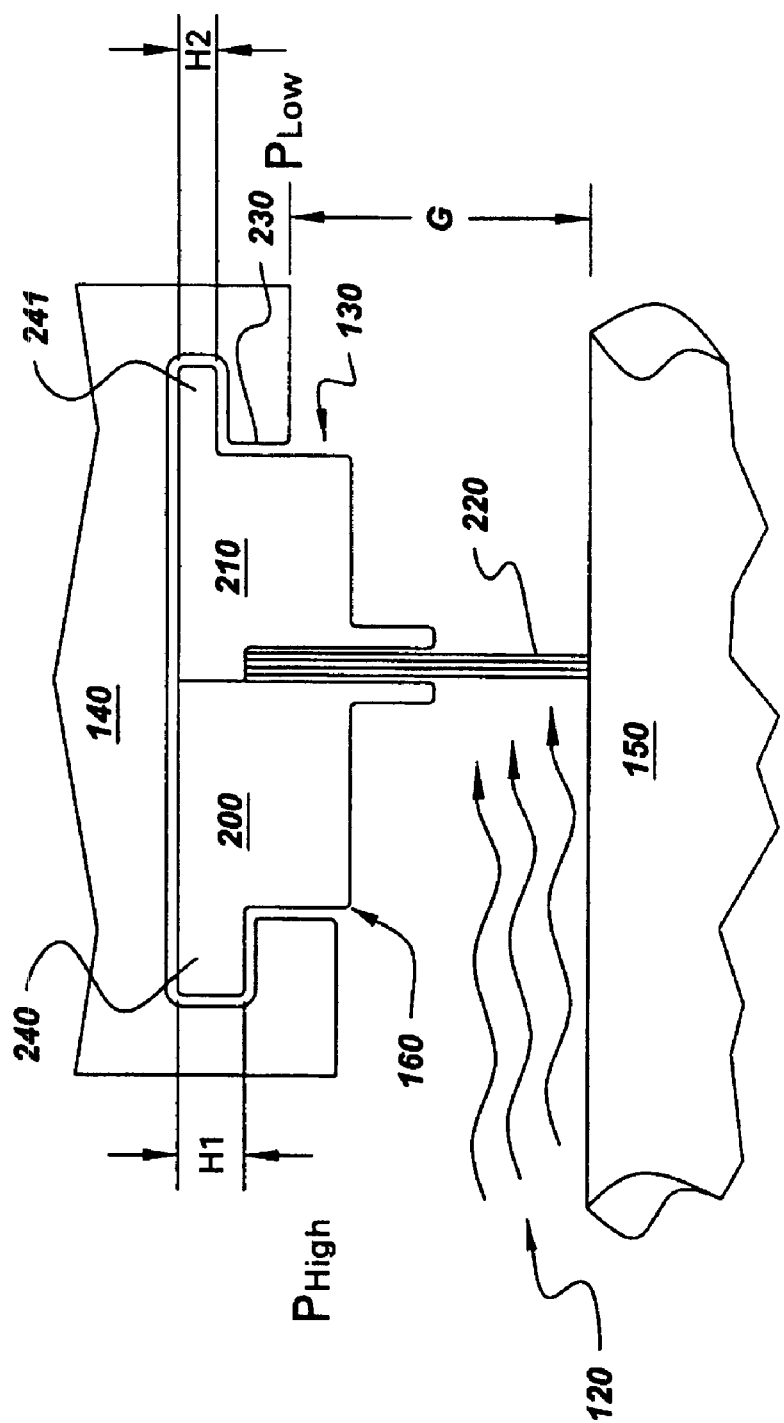
FIG. 2 is a schematic, cross-sectional view of another embodiment of the present invention.

In another embodiment, the sealing member 130 comprises an extended brush seal 160 (see FIGS. 1 and 2). The extended brush seal 160 typically comprises at least one extended front plate 200 and at least one extended back plate 210 and a plurality of bristles 220 disposed between the front plate 200 and back plate 210. In one embodiment, FIG. 1 shows extended brush seal 160 comprising a hook 240. The term "extended brush seal," as used herein, refers to a brush seal configuration comprising a longer length, designated "L", and in some cases a wider width, designated "W", wherein such configuration is not present in a conventional brush seal. In some designs, gas turbines typically comprise honeycomb seals where the labyrinth hard teeth disposed on the rotor abrade away a portion of the honeycomb segment due to differential thermal movement during startup or shutdown. The performance of the gas turbine degrades over time as a result of these transient events which cause an undesired cutting of grooves into the honeycomb material. Consequently, the undesired cutting of grooves increases the radial clearance between the stationary and rotating components thereby resulting in an increase of gas leakage and a decrease of turbine efficiency. In some designs, honeycomb seals are longer than conventional brush seals. In a honeycomb seal retrofitting embodiment when such honeycomb seals are longer than conventional brush seals, for example, the extended brush seal has a length which spans the gap between the stator and rotor in a manner sufficient for sealing and a width sized to replace removed honeycomb material. In one exemplary embodiment, the extended brush seal 160 is disposed adjacent the rotor 150 so as to restrict the flow of fluid medium 200 between Phi and Plo and thereby decrease gas leakage which results in an increase in turbine efficiency.

In an alternative embodiment, FIG. 2 shows an extended brush seal 160 comprising two hooks 240, 241 with alternating heights designated "H1" and "H2" respectively. The purpose of the alternating heights of hooks 240 and 241 is to allow extended brush seal 160 to fit in channel 230 in a predetermined manner. It will be appreciated that in fabrication of extended brush seal 160, extended brush seal 160 is formed to be matingly adapted to channel 230. Here, channel 230 typically comprises a channel configuration adaptable to the extended brush seal 160. For example, FIG. 2 shows the channel 230 comprising a "T" configuration so as to matingly receive the extended brush seal 160 comprising alternating heights "H1" and "H2".

In an exemplary method of operation, when the honeycomb seals (not shown) in a gas turbine are removed, an undesirable off-nominal radial clearance "G" between the stator 140 and the rotor 150 is created. As a result, the use of conventional brush seals to replace the honeycomb seal is limited. It will be appreciated that in some embodiments, the extended brush seal 160 typically varies in shape so as to be matingly adapted to the channel 230 configuration that was previously used by the honeycomb seal in the stator 140. In addition, the extended brush seal 160 typically varies in length designated "L1" so that the plurality of bristles 220 of extended brush seal 160 are disposed adjacent to the rotor 150 (see FIG. 1).

Figure 3:
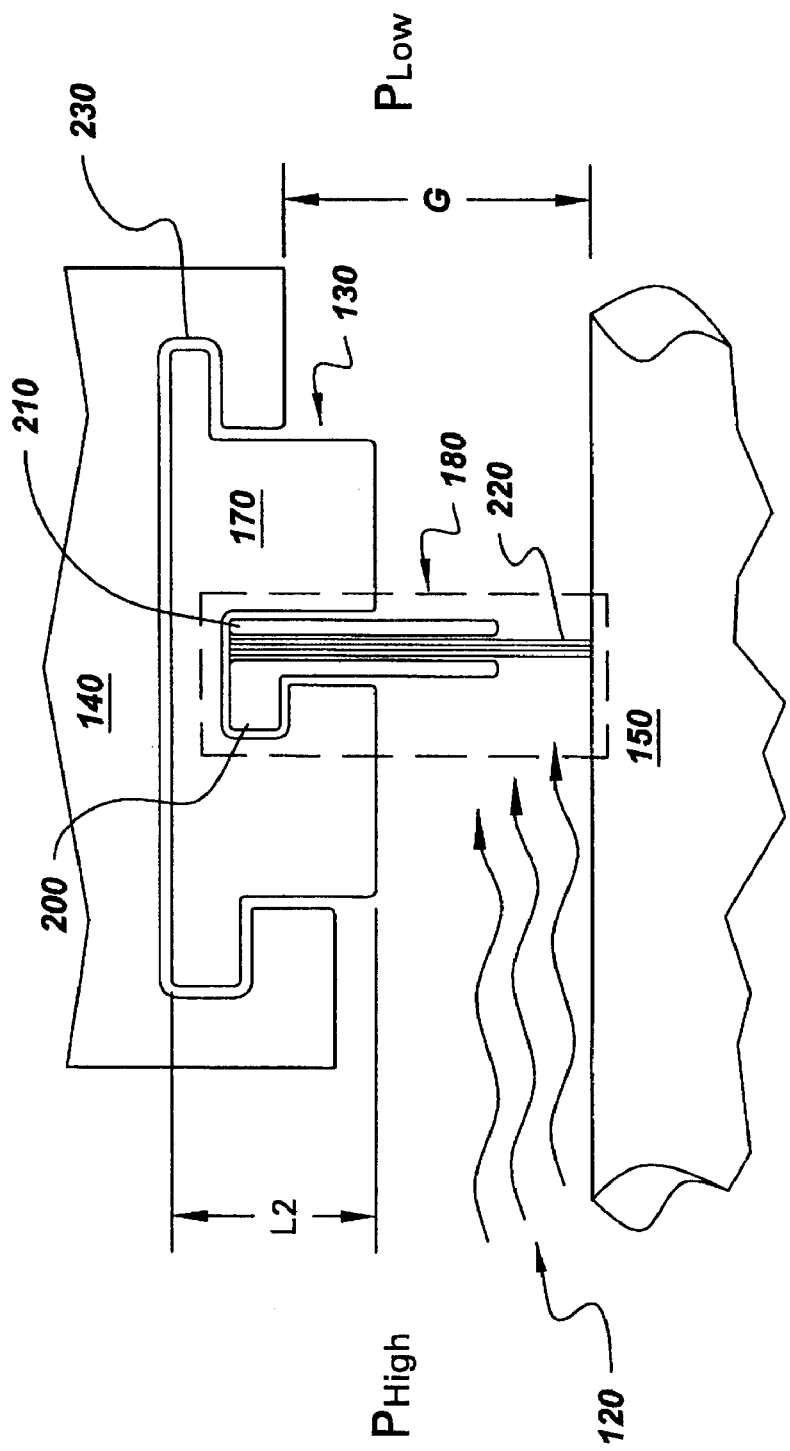
FIG. 3 is a schematic, cross-sectional view of an extension fixedly disposed in a stator wherein the extension comprises a brush seal disposed therein in accordance with another embodiment of the present invention.

In another embodiment as shown in FIG. 3, the sealing member 130 typically comprises an extension 170 comprising a brush seal assembly 180 disposed therein. The brush seal assembly 180 typically comprises at least one front plate 200 and at least one back plate 210 and a plurality of bristles 220 disposed between the front plate 200 and back plate 210. In an exemplary embodiment, the extension 170 is fixedly disposed in the channel 230 so as to minimize the off-nominal radial clearance between the stator 140 and rotor 150. Here, the shape of the extension 170 typically varies so as to be matingly adapted to the configuration of channel 230. In addition, the length of the extension 170, designated "L2", typically varies depending upon the radial clearance "G" left upon the removal of the honeycomb seal, for example. It will be appreciated that in some embodiments a conventional brush seal is fixedly disposed within said extension 170. In other embodiments, extended brush seal 160 is fixedly disposed within extension 170. For example, the extended brush seal 160 is typically fixedly disposed within extension 170 when the radial clearance "G" is too great for a conventional brush to be useful.

Figure 4:
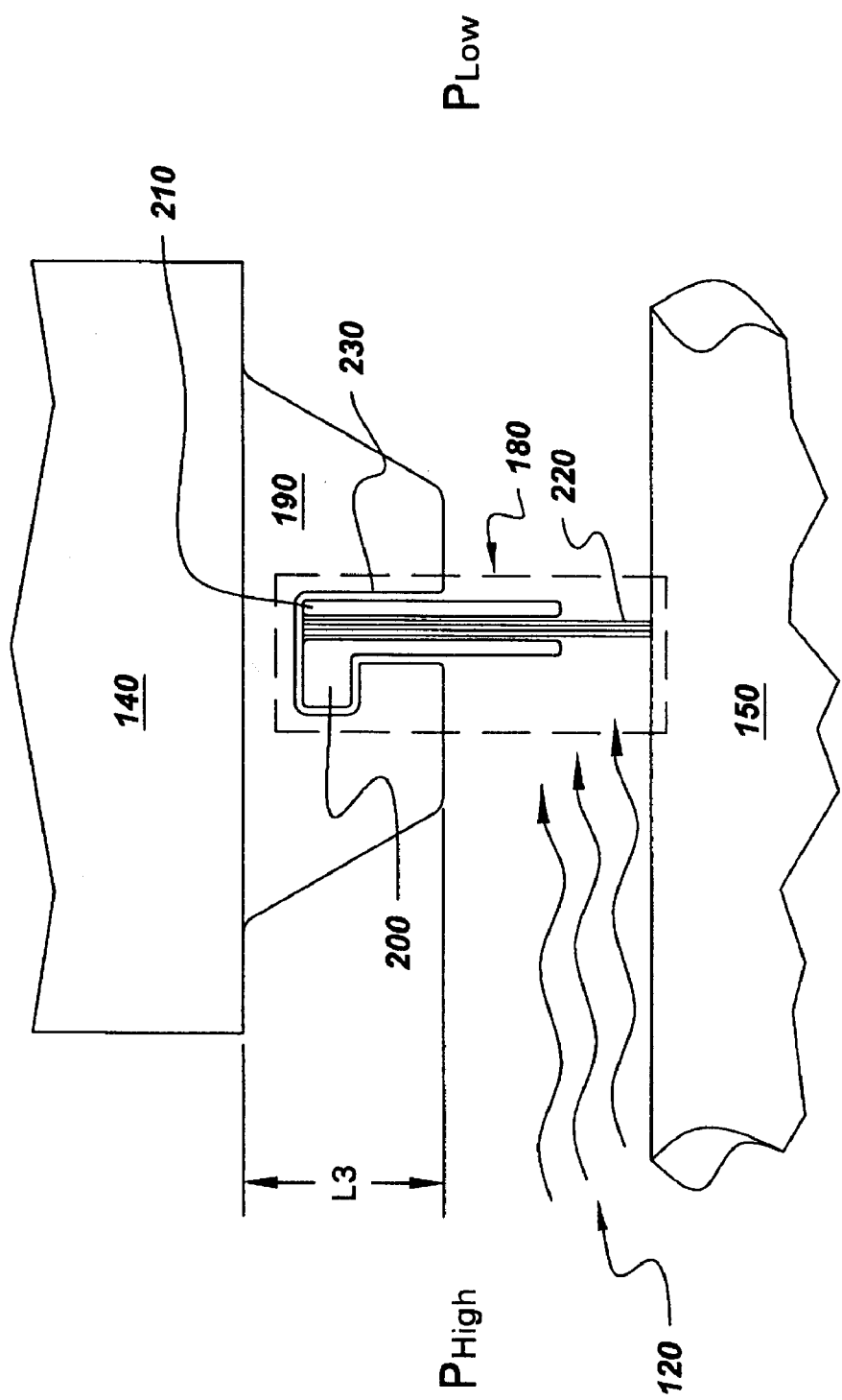
FIG. 4 is a schematic, cross-sectional view of a stator comprising a nose protruding therefrom in accordance with another embodiment of the present invention.

As shown in FIG. 4, an embodiment for a method for fabricating a gas turbine comprises the stator 140 and the rotor 150 coaxially aligned with each other wherein the rotor 150 is spaced apart from the stator 140 so as to define a gap therebetween. The embodiment comprises providing at least one nose 190 protruding from the stator 140 and extending towards the rotor 150 so as to reduce radial clearance "G". In one embodiment, the step of providing the nose 190 comprises forming the nose 190 during fabrication of the stator 140. That is, the nose 190 is formed as part of the stator 140 during fabrication of the gas turbine. In an alternative embodiment, the step of providing the nose 190 comprises forming and securing the nose 190 to the stator 140 when retrofitting the gas turbine. Here, the nose 190 is fabricated separately and secured to the stator 140 when the gas turbine is retrofitted. For example, the pre-fabricated nose 190 is useful where there are no pre-existing channels 230 and a brush seal assembly 180 is desired in specific locations of the gas turbine. It will be appreciated that that nose 190 is formed for fixedly receiving the sealing member 130 wherein the sealing member 130 is disposed adjacent the rotor 150 and that the length of the nose 190, designated "L3", typically varies depending upon the radial clearance between the stator 140 and rotor 150.

In some operations, an advantage to the abovementioned methods of retrofitting the gas turbine comprises simply removing a pre-existing seal such as a honeycomb seal and replacing such seal with the sealing member 130 thereby reducing down time of the gas turbine (see FIG. 1). Here, the sealing member 130 comprises the extended brush seal 160 or the extension 170 depending upon the radial clearance "G" left upon removal of the honeycomb seal, for example (see FIG. 3). In other operations, such method of retrofitting allows a technician to replace any pre-existing seal without having to disassemble any major parts of the rotary machinery thereby reducing repair costs. In other operations, the gas turbine is simply disassembled and a pre-fabricated nose 190 is secured to the surface of the stator 140 so as to reduce the radial clearance "G" between the stator 140 and the rotor 150 (see FIG. 4). A further advantage provided by the embodiments described herein and as shown in FIGS. 3 and 4 is that the extension 170 (see FIG. 3) and the nose 190 (see FIG. 4) are typically configured to allow a conventional brush seal to be disposed therein and generate a pressure drop generally transverse to the brush seal during the operation of the gas turbine.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of retrofitting a gas turbine comprising a stator and a rotor, said rotor coaxially aligned with said stator and spaced apart from said stator to define a gap therebetween, said method of retrofitting comprising:

replacing a honeycomb-labyrinth seal in said gas turbine with a sealing member;

fixedly securing said sealing member to said stator, said sealing member configured to restrict a flow of a fluid medium in a fluid path across said gap and generate a pressure drop generally transverse to said gap during operation of said gas turbine.

2. The method of claim 1, wherein said sealing member comprises an extended brush seal comprising at least one front plate, at least one back plate and a plurality of bristles disposed between said at least one front plate and said at least one back plate.

3. The method of claim 1, wherein said sealing member comprises an extension comprising a brush seal disposed therein.

4. A method of fabricating a gas turbine comprising a stator and a rotor, but not a honeycomb-labyrinth seal, said rotor coaxially aligned with said stator and spaced apart from said stator to define a gap therebetween, said method of fabricating comprising:

providing at least one nose protruding from said stator and extending into said gap towards said rotor, said nose fixedly receiving a sealing member wherein said sealing member is disposed adjacent said rotor and said sealing member is configured to restrict a flow of a fluid medium in a fluid path across said gap and generate a pressure drop generally transverse to said gap during operation of said gas turbine.

5. The method of claim 4, wherein the step of providing said at least one nose comprises forming said at least one nose during fabrication of said stator.

6. The method of claim 4, wherein the step of providing said at least one nose comprises forming and securing said at least one nose to said stator when retrofitting said gas turbine.

7. The method of claim 4, wherein said sealing member comprises an extended brush seal comprising at least one front plate, at least one back plate and a plurality of bristles disposed between said at least one front plate and said at least one back plate.

8. The method of claim 4, wherein said sealing member comprises an extension comprising a brush seal disposed therein.

9. A method of retrofitting a gas turbine comprising a stator and a rotor, said rotor coaxially aligned with said stator and spaced apart from said stator to define a gap therebetween, said method of retrofitting comprising:

replacing a honeycomb-labyrinth seal in said gas turbine with a brush seal;

fixedly securing an extension to a channel, said extension comprising said brush seal disposed therein, such that said brush seal is disposed adjacent said rotor for restricting a flow of a fluid medium in a fluid path and generating a pressure drop generally transverse to said gap during operation of said gas turbine, wherein said brush seal comprises at least one front plate, at least one back plate and a plurality of bristles disposed between said at least one front plate and said at least one back plate.

10. The method of claim 9, wherein said stator comprises at least one nose protruding from said stator and extending into said gap towards said rotor, said at least one nose comprising said channel.

11. A method of retrofitting a gas turbine comprising a stator and a rotor, said rotor coaxially aligned with said stator and spaced apart from said stator to define a gap therebetween, said method of retrofitting comprising:

replacing a honeycomb-labyrinth seal in said gas turbine with an extended brush seal;

fixedly securing said extended brush seal to said channel such that said extended brush seal is disposed adjacent said rotor for restricting a flow of a fluid medium in a fluid path and generating a pressure drop generally transverse to said gap during operation of said gas turbine, wherein said extended brush seal comprises at least one front plate, at least one back plate and a plurality of bristles disposed between said at least one front plate and said at least one back plate.

12. The method of claim 11, wherein said stator comprises at least one nose protruding from said stator and extending into said gap towards said rotor, said at least one nose including said channel.

13. The method of claim 11, wherein said extended brush seal comprises two hooks comprising alternating heights so as to fit in said channel in a predetermined manner.

14. The method of claim 9, wherein said stator comprises said channel.

15. The method of claim 11, wherein said stator comprises said channel.

16. A method of retrofitting a gas turbine comprising a stator and a rotor, said rotor coaxially aligned with said stator and spaced apart from said stator to define a gap therebetween, said method of retrofitting comprising:

fixedly securing a sealing member to a channel, said sealing member configured to restrict a flow of a fluid medium in a fluid path across said gap and generate a pressure drop generally transverse to said gap during operation of said gas turbine, wherein said sealing member comprises an extended brush seal comprising a front plate, a back plate and a plurality of bristles disposed between said front plate and said back plate, and wherein said sealing member comprises at least one hook designed to secure said sealing mechanism within said channel in a predetermined manner.

17. The method of claim 16, wherein said stator comprises said channel.

18. The method of claim 16, wherein said stator comprises a nose protruding therefrom and extending into said gap towards said rotor, said nose comprising said channel.

19. A method of retrofitting a gas turbine comprising a stator and a rotor, said rotor coaxially aligned with said stator and spaced apart from said stator to define a gap therebetween, said method of retrofitting comprising:

fixedly securing a sealing member to a channel, said sealing member configured to restrict a flow of a fluid medium in a fluid path across said gap and generate a pressure drop generally transverse to said gap during operation of said gas turbine, wherein said sealing member comprises an extended brush seal comprising a front plate, a back plate and a plurality of bristles disposed between said front plate and said back plate, and wherein said sealing member comprises at least two hooks designed to secure said sealing mechanism within said channel in a predetermined manner.

20. The method of claim 19, wherein said stator comprises said channel.

21. The method of claim 19, wherein said stator comprises a nose protruding therefrom and extending into said gap towards said rotor, said nose comprising said channel.

* * * * *